Patented Jan. 5, 1954

2,665,256

UNITED STATES PATENT OFFICE 2,665,256

SOLID COMPOSITIONS CONTAINING POLY-OXYETHYLENE ETHERS AND UREA

George E. Barker, Wilmington, Del., assignor to Atlas Powder Company, Wilmington, Del., a corporation of Delaware No Drawing. Application January 23, 1948, Serial No. 4,082

18 Claims. (Cl. 252—152)

The present invention relates to solid compositions containing polyoxyethylene ethers.

An object of the invention is to provide a solid composition containing a polyoxyethylene ether.

Another object is to provide a method for solidifying a normally liquid to soft waxy polyoxyethylene ether.

A further object is to provide a solid detergent composition containing a normally liquid to soft waxy polyoxyethylene ether detergent.

A still further object is to provide means for controlling the rate of solution of a water-soluble polyoxyethylene ether detergent composition by incorporating it into a solid composition which can be formed into the shape of bars or the like and used after the fashion of hard soap.

The above and other objects will become more fully apparent in the course of the following description.

Polyoxyethylene ethers constitute a class of increasingly valuable chemical materials. In this class are emulsifiers, detergents, surface active agents, solvents, conditioning agents, and the like. A number of the ethers in this class are liquids or are soft waxy materials under ordinary conditions. It is well known in the art that the consistency of such compounds depends on the number of oxyethylene groups and on the carbon chain length and nature of any radicals attached to the oxyethylene group. While it is therefore possible to find individual ethers which are normally solid, it frequently happens that for a particular use the preferable, and often the only operative compounds, are normally liquid or soft waxy substances. It is desirable for some end uses of these polyoxyethylene ethers to have them in solid form, for example, in molded bars, tablets, chips, or powders. The conventional solution to such a problem is generally either to absorb the liquid or soft material in a solid carrier or to dissolve in the material some substances which will increase its body or cause it to gel. There are objections to these approaches to the problem, particularly in that physically suitable absorbents or bodying agents are often unsuitable for the intended end use of the polyoxyethylene ether, or undesirable proportions of the absorbent or bodying agent may be required.

In accordance with the present invention, it has been discovered that many of the normally liquid to soft waxy polyoxyethylene ethers form solid mixtures with urea. The scientific explanation of this phenomenon is not known but it is believed to be quite different from the action of absorbents or bodying or gelling agents referred to above. The effect is specific to certain classes of the polyoxyethylene ethers. On mixing together a quantity of finely divided solid urea and one of the operative polyoxyethylene ethers, the product is initially a soft, moldable mixture of a suitable polyoxyethylene ether and crystalline urea, but on standing for a short time, the mixture undergoes concretion and sets up to a hard mass which can be used as such or reduced to smaller pieces. As they set up, many of the compositions show a marked increase in volume which is often sufficient in extent, for example, to cause the breakage of a glass beaker containing the composition. The solidification or concretion is not associated with loss of water. In some specific embodiments of the invention, compositions made with substantial quantities of water solidify without appreciable loss of weight. The final concreted product is not softened until the temperature is raised to about the melting point of the urea.

One of the most valuable features of the invention at the present time resides in the preparation in solid form of some of the more valuable polyoxyethylene ether detergent compounds which are normally liquids or soft waxes. By means of the invention, these detergents can be prepared in bar, chipped or granulated form. The urea in the composition is water-soluble and unobjectionable for this end use. Additives such as inorganic soap builders, foaming agents, emollients, supplementary detergents, germicides, etc., can be included in the compositions to impart their conventional properties.

Other typical end uses for the compositions of the invention are in various emulsifying operations, as in cosmetic and pharmaceutical manufacture, the preparation of petroleum oil emulsions, textile conditioning and lubricating emulsions, insecticidal and fungicidal emulsions, and the like. In some of these uses the urea serves a recognized purpose, for example, as a stabilizer or antacid. By means of the invention, the normally liquid or soft waxy polyoxyethylene ethers can be used in solid form with substantial advantages in packaging, handling and measurement. Molded, pressed or cut pieces can be readily prepared to contain any desired constant quantity of the polyoxyethylene ether so that accurate quantities can be measured by the user by simple count and without weighing or making a volume measurement.

Several types of polyoxyethylene ethers have been found useful in the present invention. The useful ethers may be classified as follows:

(a) The polyoxyethylene ethers of the 1 to 10 carbon atom aliphatic alcohols, wherein the ethers contain at least eight oxyethylene groups per mol. Typical examples of this type are the polyoxyethylene ether of methanol containing eight oxyethylene groups; octaethylene glycol; nonaethylene glycol; the commercially available mixed polyethylene glycols with average molecular weights of 400, 1000, and 1540; polyoxyethylene ether of propylene glycol containing 10 oxyethylene groups; polyoxyethylene ether of glycerol containing 15 oxyethylene groups; polyoxyethylene ether of butanol containing 8 oxyethylene groups; polyoxyethylene ether of sorbitol containing 20 oxyethylene groups; polyoxyethylene ether of decanol containing 12 oxyethylene groups.

(b) The polyoxyethylene ethers of the 12 to 30 carbon atom fatty alcohols containing at least 2 oxyethylene groups per alcohol radical. Typical examples of such ethers are polyoxyethylene ethers of lauryl alcohol with 2, 5, 23, and 75 oxyethylene groups respectively per lauryl radical; polyoxyethylene ethers of cetyl alchol with 2 and 20 oxyethylene groups respectively per cetyl radical; polyoxyethylene ether of oleyl alcohol with 10 oxyethylene groups; polyoxyethylene ether of stearyl alcohol with 6 oxyethylene groups; polyoxyethylene ether of carnaubyl alcohol with 20 oxyethylene groups; polyoxyethylene ether of ceryl alcohol with 20 oxyethylene groups; polyoxyethylene ether of melissyl alcohol with 2 oxyethylene groups; polyoxyethylene ether of octadecandiol with 10 oxyethylene groups.

(c) The polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical. Examples of this type are polyoxyethylene ether of propylene glycol monolaurate containing 10 oxyethylene groups; polyoxyethylene ether of glycerol dimyristate containing 20 oxyethylene groups; polyoxyethylene ether of sorbitan monolaurate containing 10 oxyethylene groups; polyoxyethylene ether of mannide monomyristate containing 20 oxyethylene groups; and polyoxyethylene ether of sorbitol di-pentadecanoate containing 20 oxyethylene groups.

(d) The polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical. Examples of these ethers are: polyoxyethylene ether of propylene glycol monopalmitate containing 10 oxyethylene groups; polyoxyethylene ether of glycerol di-stearate containing 20 oxyethylene groups; polyoxyethylene ether of sorbitan monoabietate (rosin acids) containing 16 oxyethylene groups; polyoxyethylene ether of sorbitan monoester of tall oil acids (mixed rosin and aliphatic acids) containing 15 oxyethylene groups; polyoxyethylene ether of glycerol triricinoleate containing 60 oxyethylene groups; polyoxyethylene ether of glycerol monobehenate containing 12 oxyethylene groups; and polyoxyethylene ether of pentaerythritol monomelissate containing 20 oxyethylene groups.

(e) The esters of 12 to 30 carbon atom aliphatic carboxylic acids and hydroxy polyoxyethylene ethers of 1 to 10 carbon atom aliphatic alcohols other than ethylene glycol, wherein the esters contain at least 7 oxyethylene groups per acid radical. Examples of these esters are: lauric acid ester of the monomethyl ether of nonaethylene glycol; lauric acid diester of the polyoxyethylene ether of propylene glycol containing 20 oxyethylene groups; myristic acid diester of the polyoxyethylene ether of glycerol containing 15 oxyethylene groups; palmitic acid ester of the polyoxyethylene ether of pentaerythritol containing 20 oxyethylene groups; oleic acid triester of the polyoxyethylene ether of mannitol containing 30 oxyethylene groups; stearic acid ester of the monobutyl ether of nonaethylene glycol; lauric acid ester of the polyoxyethylene ether of octyl alcohol containing 20 oxyethylene groups; and melissic acid ester of the polyoxyethylene ether of decyl acohol containing 10 oxyethylene groups. It should be noted that ether-esters wherein the carboxylic acids are mixtures of aliphatic acids and rosin acids, such as that existing in commercial tall oil, can also be solidified with urea but in such cases more than 7 oxyethylene groups per acid radical are required. Typical mixed acid products that can be used are the tall oil monoester of the polyoxyethylene ether of sorbitol containing 40 oxyethylene groups; the tall oil tetraester of the polyoxyethylene ether of sorbitol containing 75 oxyethylene groups; and the tall oil hexa-ester of the polyoxyethylene ether of sorbitol containing 75 oxyethylene groups.

(f) The polyoxyethylene ethers of alkyl phenols with from 5 to 12 carbon atoms in the alkyl groups, wherein the ethers contain at least 9 oxyethylene groups per mol. Examples of these ethers are: the polyoxyethylene ether of p-tertiary amyl phenol containing 9 oxyethylene groups; the polyoxyethylene ether of octyl-phenol containing 10 oxyethylene groups; and the polyoxyethylene ether of dodecyl phenol containing 20 oxyethylene groups.

The polyoxyethylene ethers referred to above belong to well-known chemical classes and many of the specific members of the classes have been described in the literature. The polyethylene glycols can be prepared, as is well known, by the reaction of ethylene oxide and water using the mol ratio called for by the desired product. Alternatively, a preformed ethylene or lower polyethylene glycol can be used as starting material and ethylene oxide reacted with it to produce the longer chain polyethylene glycols. The ethers of the various alcohols referred to can be made by the known process of adding several molecular proportions of ethylene oxide to the selected alcohol, thus forming the hydroxy-polyoxyethylene ether. The free hydroxyl groups of such ethers can be esterified by conventional esterification methods forming the esters referred to above. Polyoxyethylene ethers of hydroxylic esters can be made by analogous processes which are in themselves well-known. Thus a partial ester of a carboxylic acid and a polyhydroxylic compound can be reacted with ethylene oxide as though it were an alcohol to produce the polyoxyethylene ether. In a similar fashion, the esters of hydroxy-carboxylic acids such as glycerol tri-ricinoleate can be reacted with ethylene oxide to produce polyoxyethylene ethers which are useful in the invention. Compounds having phenolic hydroxyl groups likewise react with ethylene oxide to produce polyoxyethylene ethers. In this manner, the ethers of the alkyl phenols can be made. Details of the processes for making derivatives of these several types are to be found particularly in the patents to Davidson, 1,633,927; Schmidt and Meyer, 1,922,459 and 1,959,930; and Schoeller and Wittwer, 1,970,578. As indicated in some of these patents and elsewhere in the art, polyoxyethylene ethers of the types referred to can also be prepared by indirect chemical methods such as by forming the sodio derivative of a polyglycol and reacting it with a halogen derivative of a hydrocarbon. In most cases, however, it will be preferable to form these ethers by means of the ethylene oxide reaction.

As prepared commercially, the polyoxyethylene ethers are invariably mixtures of related compounds of the same chemical types, due to the use of commercial grade ingredients and to the use of the ethylene oxide reaction or of commercial mixtures of polyethylene glycols. The use of the term "compound" in this specification and in the claims is for purpose of convenience and is not to be taken as exclusive of mixtures of compounds.

It will be noted that in describing the polyoxyethylene ethers, the minimum number of oxyethylene groups is stated but not the maximum number. This is for the reason that the solidification phenomenon with urea on which the invention is based occurs with all the higher polyoxyethylene compounds. It is well known that these polyoxyethylene compounds become harder waxes as the number of oxyethylene groups is increased. The number of oxyethylene groups at which a given hardness is exhibited will depend on the chemical nature and size of the radicals to which the polyoxyethylene chains are bonded. The upper limit of the number of oxyethylene groups in the ethers useful in the invention does not depend on a loss of solidification tendency with urea, but is a practical limit depending on the intended use of the composition. For example, if the property desired is merely physical hardness, it would be unnecessary to use the invention in the upper ranges of oxyethylene content because there the compounds have the requisite hardness. On the other hand, if the object is to reduce the rate of solution in water, it may be desirable to use the invention even with those ethers which are hard waxes at the temperatures prevailing in the intended use.

A particularly useful sub-group of the polyoxyethylene ethers useful in this invention comprises those which are water-soluble. By forming the mixture of urea and a water-soluble polyoxyethylene ether into a relatively large shaped body such as a cake or bar, the rate of solution of the ester in water is greatly retarded. This makes it possible to use those ethers which have valuable detergent properties in the form of a bar which can be used like bar soap even though the water solubility of the ether far exceeds that of soap.

The compositions of the invention can be made by either of two methods. In the first method the selected polyoxyethylene ether is intimately mixed with finely divided urea forming a soft moldable mixture which is then set aside and allowed to set-up. In this method the urea is employed in solid form and the polyoxyethylene ether is used cold if it is normally liquid, or is warmed to reduce it to the liquid state if it is a normally waxy material. The aging or setting-up stage of this method may occupy from a few hours to several days time, depending on the particular ether used and the proportions of ether and urea.

In the second method for practising the invention, the urea is carefully melted and the polyoxyethylene ether intimately mixed with the molten urea. Care must be taken in this method not to over-heat the urea since it readily decomposes. This method is best practised by heating the urea under carefully controlled conditions such as in an oil bath and rapidly mixing in the ether to form the mixture. After mixing, the composition can be poured into suitable molds and allowed to solidify.

The end products of the two methods appear to be essentially the same. The second method does not require the prolonged setting-up period required by the first method. However, the same limitations on the polyoxyethylene ethers have been observed to apply to both methods of making the compositions.

The proportions of polyoxyethylene compound and urea may be varied within fairly wide limits. There is a limit to the proportion of liquid or soft polyoxyethylene ether that may be used to obtain the solid compositions of the invention. The exact value of this limit depends on the particular ether. In general, the best compositions of this invention are found in the range 50 to 90% urea and 50 to 10% polyoxyethylene ether. Especially useful compositions have been found in the approximate proportion of 70% urea and 30% polyoxyethylene ether.

The following table sets forth several examples of solid compositions in accordance with the invention. The tabulated examples were carried out in accordance with the first method described above. In each case finely divided urea in the indicated quantity was placed in a mixing bowl and the polyoxyethylene ether was slowly added in liquid form (melted if necessary) while stirring with a motor-driven stirrer to obtain adequate mixing. After mixing was completed, the compositions were placed in containers and set aside to harden. Under the heading "remarks," the table indicates the time at which the composition was observed to have set-up.

SOLID COMPOSITIONS FROM UREA AND POLYOXYETHYLENE ETHERS

| Example | Polyoxyethylene ether | Quantity (grams) | Urea Quantity (grams) | Remarks |
|---|---|---|---|---|
| 1 | Polyoxyethylene ether of sorbitan mono-laurate, averaging 10 oxyethylene groups per mol. | 30 | 70 | Cake firm after 5 days. |
| 2 | ___do___ | 10 | 90 | Do. |
| 3 | Polyoxyethylene ether of sorbitan mono-oleate, averaging 20 oxyethylene groups per mol. | 20 | 80 | Cake hard after 5 days. |
| 4 | ___do___ | 10 | 90 | Cake firm after 5 days. |
| 5 | ___do___ | 50 | 50 | Do. |
| 6 | Polyoxyethylene ether of sorbitan mono-laurate, averaging 20 oxyethylene groups per mol. | 30 | 70 | Do. |
| 7 | Polyoxyethylene ether of sorbitan tri-oleate, averaging 20 oxyethylene groups per mol. | 30 | 70 | Cake firm after 2 days. |
| 8 | Polyoxeythylene ether of methanol, averaging 8 oxyethylene groups per mol. | 30 | 70 | Cake hard after 5 days. |

SOLID COMPOSITIONS FROM UREA AND POLYOXYETHYLENE ETHERS—Continued

| Example | Polyoxyethylene ether | Urea | Remarks |
|---|---|---|---|
| | | Quantity (grams) | Quantity (grams) | |
| 9 | Polyoxyethylene ether of methanol, averaging 12 oxyethylene groups per mol. | 30 | 70 | Cake hard after 24 hours. |
| 10 | Polyoxyethylene ether of methanol, averaging 16 oxyethylene groups per mol. | 30 | 70 | Do. |
| 11 | Polyoxyethylene ether of lauryl alcohol, averaging 2 oxyethylene groups per mol. | 30 | 70 | Cake hard after 5 days. |
| 12 | Polyoxyethylene ether of lauryl alcohol, averaging 4.7 oxyethylene groups per mol. | 30 | 70 | Cake hard after 3 days. |
| 13 | Polyoxyethylene ether of lauryl alcohol, averaging 23 oxyethylene groups per mol. | 30 | 70 | Cake hard after 24 hours. |
| 14 | Polyoxyethylene ether of lauryl alcohol, averaging 75 oxyethylene groups per mol. | 30 | 70 | Do. |
| 15 | Polyoxyethylene ether of cetyl alcohol, averaging 2 oxyethylene groups per mol. | 30 | 70 | Do. |
| 16 | Polyoxyethylene ether of cetyl alcohol, averaging 20 oxyethylene groups per mol. | 30 | 70 | Do. |
| 17 | Polyoxyethylene ether of castor oil, averaging 60 oxyethylene groups per mol. | 30 | 70 | Do. |
| 18 | Polyoxyethylene ether of octyl phenol, averaging 10 oxyethylene groups per mol. | 30 | 70 | Cake hard after 4 days. |
| 19 | Polyoxyethylene ether of p-tert-amylphenol, averaging 9 oxyethylene groups per mol. | 30 | 70 | Cake hard after 5 days. |
| 20 | Polyethylene glycol mixture with an average molecular weight of 1,000. | 30 | 70 | Cake hard after 1 day. |
| 21 | Polyethylene glycol mixture with an average molecular weight of 400. | 30 | 70 | Cake hard after 4 days. |

*Example 22*

A solid bar detergent was prepared by mixing 15 grams polyoxyethylene ether of sorbitan monolaurate with an average of 10 oxyethylene groups per mol, 5 grams polyoxyethylene ester of stearic acid with an average of 40 oxyethylene groups per mol, and 5 grams of a 2.5% solution of high viscosity sodium carboxy methyl-cellulose in water, into 75 grams finely divided crystalline urea. The mixture was placed in a bar mold and allowed to age. A good hard bar was obtained after 2 days aging.

In this example a colloidal material, sodium carboxy - methyl - cellulose, was employed to modify the texture of the bar.

*Example 23*

Most of the polyoxyethylene detergents produce very little foam when used for their intended purpose. A bar with improved foaming characteristics was prepared by mixing 25 grams polyoxyethylene ether of sorbitan monolaurate with an average of 10 oxyethylene groups per mol, 5 grams of the sodium salt of the oleyl amide of taurine ($C_{17}H_{33}CONHC_2H_4SO_3Na$), into 70 grams finely divided crystalline urea. The mixture was placed in a bar mold and allowed to age. After aging for 5 days a firm bar was obtained.

*Example 24*

Another foaming bar detergent was prepared by mixing 25 grams polyoxyethylene ether of sorbitan monolaurate with an average of 10 oxyethylene groups per mol, and 5 grams of the sodium salt of an alkylated benzene sulfonate wherein the alkyl groups are the residues of the paraffins in commerical kerosene, into 70 grams finely divided crystalline urea. The mixture was placed in a mold and allowed to age. After aging a relatively soft cake was obtained that disintegrated rather easily in water.

The second formulating method for preparing the compositions of the invention is illustrated in the following 2 examples.

*Example 25*

140 grams urea were heated to 132 to 135° C. in a tall beaker set in an oil bath. When the urea was almost completely melted, 60 grams polyoxyethylene ether of sorbitan monolaurate, averaging 10 oxyethylene groups per mol were added and the mixture stirred mechanically until uniform, when it was poured into molds and allowed to cool. Upon solidification, the bars were ejected from the molds. In preparing the composition by this method, it is necessary to avoid overheating and prolonged heating of the urea to prevent decomposition.

*Example 26*

130 grams urea and 5 grams sodium carboxymethyl cellulose were melted together by heating at 132 to 135° C. on an oil bath. With rapid mechanical agitation, 60 grams polyoxyethylene ether of octyl-phenol, averaging 9 oxyethylene groups per mol, and 5 grams lanolin were added. Agitation was continued until a uniform mixture was obtained. The melted mass was then poured into a mold, cooled, and removed, producing a smooth hard cake.

It is to be understood that the hot melt technique illustrated by the last two examples may be applied as well to the production of the other compositions included within the scope of the invention. Where satisfactory arrangements are available for carefully melting the urea and rapidly mixing the other ingredients, the hot melt method will be preferable. An obvious advantage of the hot melt method is the elimination of the setting up period which, in the case of the compositions produced by the cold method, may require storage for periods up to several days. However, the cold method involves a much simpler mixing operation and, for this reason, may be preferred in many cases.

The foregoing examples illustrate a wide range of compositions according to the invention. The invention is not, however, to be taken as limited to the specific ingredients, proportions or preparatory methods given by way of example. If desired, the solid compositions of the invention can be prepared using mixtures of polyoxyethylene ethers selected from two or more of the above-defined operative chemical classes. It is frequently found that mixtures of this type are more efficient for a particular problem in emulsification or detergency than any of the individual components alone. The preferred embodiment of the invention for detergent use is the composition containing the polyoxyethylene ether of sorbitan monolaurate with an average of 10 oxyethylene groups per mol.

What is claimed is:

1. A composition consisting essentially of the solid concretion product of urea and at least one normally liquid to soft waxy polyoxyethylene ether selected from the group consisting of: (a) polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical; (b) polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical; (c) esters of 12 to 30 carbon atom aliphatic carboxylic acids and hydroxy polyoxyethylene ethers of 1 to 10 carbon atom aliphatic alcohols, other than ethylene glycol, wherein the esters contain at least 7 oxyethylene groups per acid radical; said solid concretion product containing at least 10 per cent by weight of said polyoxyethylene ether.

2. A composition consisting essentially of the solid concretion product of urea and at least one normally liquid to soft waxy polyoxyethylene ether of a hydroxylic ester of a 16 to 30 carbon atom carboxylic acid and a hydroxylic compound with from 3 to 6 carbon atoms, of which at least 3 are in an uninterrupted chain, wherein the ethers contain at least 6 oxyethylene groups per acid radical; said solid concretion product containing at least 10 per cent by weight of said polyoxyethylene ether.

3. A composition consisting essentially of the solid concretion product of urea and at least one normally liquid to soft waxy polyoxyethylene ether of a partial ester of sorbitan and a 16 to 30 carbon atom carboxylic acid, wherein the ether contains at least 6 oxyethylene groups per acid radical; said solid concretion product containing at least 10 per cent by weight of said polyoxyethylene ether.

4. A composition consisting essentially of the solid concretion product of urea and at least one normally liquid to soft waxy polyoxyethylene ether of a hydroxylic ester of a 12 to 15 carbon atom carboxylic acid and a polyhydric compound with from 3 to 6 carbon atoms of which at least 3 are in an uninterrupted chain, wherein the ether contains at least 10 oxyethylene groups per acid radical; said solid concretion product containing at least 10 per cent by weight of said polyoxyethylene ether.

5. A composition consisting essentially of the solid concretion product of urea and a polyoxyethylene ether of sorbitan monolaurate wherein the ether contains an average of about 10 oxyethylene groups per mol; said solid concretion product containing at least 10 per cent by weight of said polyoxyethylene ether.

6. A solid composition consisting essentially of the concretion product of from 50 to 10% by weight of at least one normally liquid to soft waxy polyoxyethylene ether selected from the group consisting of: (a) polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical; (b) polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical; (c) esters of 12 to 30 carbon atom aliphatic carboxylic acids and hydroxy polyoxyethylene ethers of 1 to 10 carbon atom aliphatic alcohols, other than ethylene glycol, wherein the esters contain at least 7 oxyethylene groups per acid radical; and from 50 to 90% by weight urea.

7. A solid composition as defined in claim 6, wherein the said polyoxyethylene ether is water-soluble.

8. A solid composition as defined in claim 7 wherein the said polyoxyethylene ether is a water soluble polyoxyethylene ether of sorbitan mono-oleate.

9. A solid composition consisting essentially of the concretion product of from 50 to 10% by weight of at least one normally liquid to soft waxy polyoxyethylene ether of a hydroxylic ester of a 12 to 15 carbon atom carboxylic acid and a polyhydric compound with from 3 to 6 carbon atoms, of which at least 3 are in an uninterrupted chain, wherein the ether contains at least 10 oxyethylene groups per acid radical; and from 50 to 90% by weight urea.

10. A solid composition consisting essentially of the concretion product of from 50 to 10% by weight of at least one normally liquid to soft waxy polyoxyethylene ether of a partial ester of sorbitan and a 12 to 15 carbon atom carboxylic acid, wherein the ether contains at least 10 oxyethylene groups per acid radical and from 50 to 90% by weight urea.

11. A solid composition consisting essentially of the concretion product of from 50 to 10% by weight of a polyoxyethylene ether of sorbitan monolaurate containing an average of about 10 oxyethylene groups per mol; and from 50 to 90% by weight urea.

12. A solid composition consisting essentially of the concretion product of about 30% by weight of at least one normally liquid to soft waxy polyoxyethylene ether selected from the group consisting of: (a) polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical; (b) polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical; (c) esters of 12 to 30 carbon atom aliphatic carboxylic acids and hydroxy polyoxyethylene ethers of 1 to 10 carbon atom aliphatic alcohols, other than ethylene glycol, wherein the esters contain at least 7 oxyethylene groups per acid radical; and about 70% by weight urea.

13. The method which comprises intimately admixing urea and at least one normally liquid to soft waxy polyoxyethylene ether selected from the group consisting of: (a) polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical; (b) polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical;

(c) esters of 12 to 30 carbon atom aliphatic carboxylic acids and hydroxy polyoxyethylene ethers of 1 to 10 carbon atom aliphatic alcohols, other than ethylene glycol, wherein the esters contain at least 7 oxyethylene groups per acid radical; the quantity of urea so admixed being sufficient to combine with said ether to form a concreted mixture; and allowing the mixture to set-up to solid form.

14. The method defined in claim 13, wherein the said urea is employed in the proportion of from 50 to 90% by weight and the said polyoxyethylene ether is employed in the proportion of from 50 to 10% by weight.

15. The method which comprises intimately admixing finely divided solid urea and at least one normally liquid to soft waxy polyoxyethylene ether selected from the groups consisting of: (a) polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical; (b) polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical; (c) esters of 12 to 30 carbon atom aliphatic carboxylic acids and hydroxy polyoxyethylene ethers of 1 to 10 carbon atom aliphatic alcohols, other than ethylene glycol, wherein the esters contain at least 7 oxyethylene groups per acid radical; the quantity of urea so admixed being sufficient to combine with said ether to form a concreted mixture; and allowing the mixture to set-up to solid form.

16. The method defined in claim 15, wherein the said urea is employed in the proportion of from 50 to 90% by weight and the said polyoxyethylene ether is employed in the proportion of from 50 to 10% by weight.

17. The method which comprises intimately admixing molten urea and at least one normally liquid to soft waxy polyoxyethylene ether selected from the groups consisting of: (a) polyoxyethylene ethers of hydroxylic esters of 12 to 15 carbon atom carboxylic acids and polyhydric compounds with from 3 to 6 carbon atoms, of which at least 3 are in an uninterrupted chain, wherein the ethers contain at least 10 oxyethylene groups per acid radical; (b) polyoxyethylene ethers of hydroxylic esters of 16 to 30 carbon atom carboxylic acids and hydroxylic compounds with from 3 to 6 carbon atoms, of which at least 3 are in an uninterrupted chain, wherein the ethers contain at least 6 oxyethylene groups per acid radical; (c) esters of 12 to 30 carbon atom aliphatic carboxylic acids and hydroxy polyoxyethylene ethers of 1 to 10 carbon atom aliphatic alcohols, other than ethylene glycol, wherein the esters contain at least 7 oxyethylene groups per acid radical; the quantity of urea so admixed being sufficient to combine with said ether to form a concreted mixture; and allowing the mixture to set-up in solid form.

18. The method defined in claim 17, wherein the said urea is employed in the proportion of from 50 to 90% by weight and the said polyoxyethylene ether is employed in the proportion of from 50 to 10% by weight.

GEORGE E. BARKER.

References Cited in the file of this patent

UNITED STATES PATENTS

| Number | Name | Date |
| --- | --- | --- |
| 1,970,578 | Schoeller et al. | Aug. 21, 1934 |
| 2,322,820 | Brown | June 29, 1943 |
| 2,374,187 | Flett | Apr. 24, 1945 |

FOREIGN PATENTS

| Number | Country | Date |
| --- | --- | --- |
| 443,795 | Great Britain | Mar. 6, 1936 |